(12) United States Patent  
Kawabe et al.

(10) Patent No.: US 8,896,952 B2  
(45) Date of Patent: Nov. 25, 2014

(54) DISK STORAGE APPARATUS AND METHOD FOR SERVO CONTROLLING

(71) Applicant: Kabushiki Kaisha Toshiba, Tokyo (JP)

(72) Inventors: Takayuki Kawabe, Sagamihara (JP); Makoto Asakura, Tokyo (JP); Takuji Matsuzawa, Kashiwa (JP); Takeyori Hara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/851,212

(22) Filed: Mar. 27, 2013

(65) Prior Publication Data

US 2014/0153127 A1  Jun. 5, 2014

(30) Foreign Application Priority Data

Nov. 30, 2012 (JP) .................................. 2012-263075

(51) Int. Cl.
  *G11B 5/09* (2006.01)
  *G11B 20/10* (2006.01)
  *G11B 5/596* (2006.01)

(52) U.S. Cl.
  CPC . *G11B 5/09* (2013.01); *G11B 5/596* (2013.01); *G11B 20/10388* (2013.01)
  USPC ........................................................ 360/48

(58) Field of Classification Search
  None
  See application file for complete search history.

(56) References Cited

U.S. PATENT DOCUMENTS

| 7,606,624 | B2* | 10/2009 | Cullen ............................ 700/29 |
| 8,331,655 | B2* | 12/2012 | Sato et al. ..................... 382/159 |
| 2009/0231751 | A1 | 9/2009 | Asakura et al. |

FOREIGN PATENT DOCUMENTS

| JP | 07-007985 A | 1/1995 |
| JP | 2005-196558 A | 7/2005 |
| JP | 2009-217917 A | 9/2009 |

* cited by examiner

*Primary Examiner* — K. Wong
(74) *Attorney, Agent, or Firm* — Posz Law Group, PLC

(57) ABSTRACT

According to one embodiment, a disk storage apparatus includes an interrupt controller and a servo controller. The interrupt controller determines whether or not to carry out servo interrupt processing and holds a number of negative results of the determination. The servo controller includes an internal model configured to calculate an estimated current position of the head. The servo controller corrects a state of the internal model based on the number of negative results of the determination and performs head positioning control based on a result of a calculation of the internal model, if the result of the determination by the interrupt controller is affirmative.

20 Claims, 6 Drawing Sheets

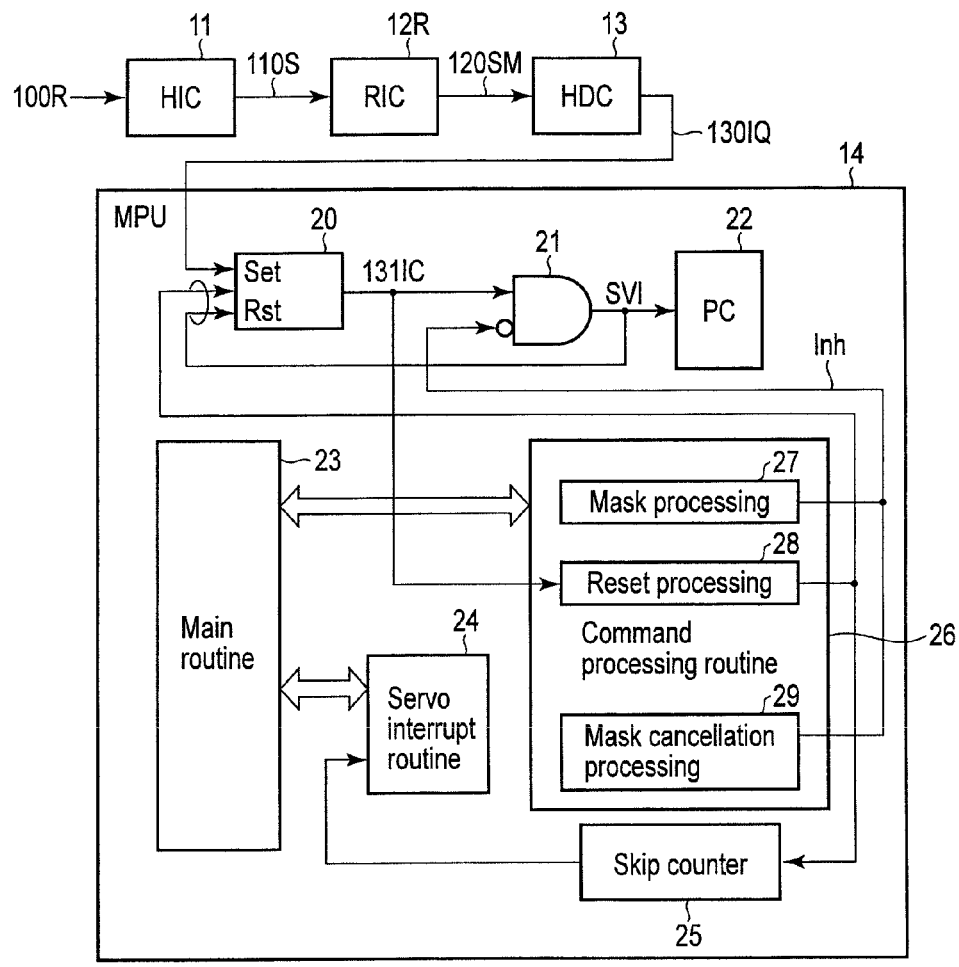
F I G. 1

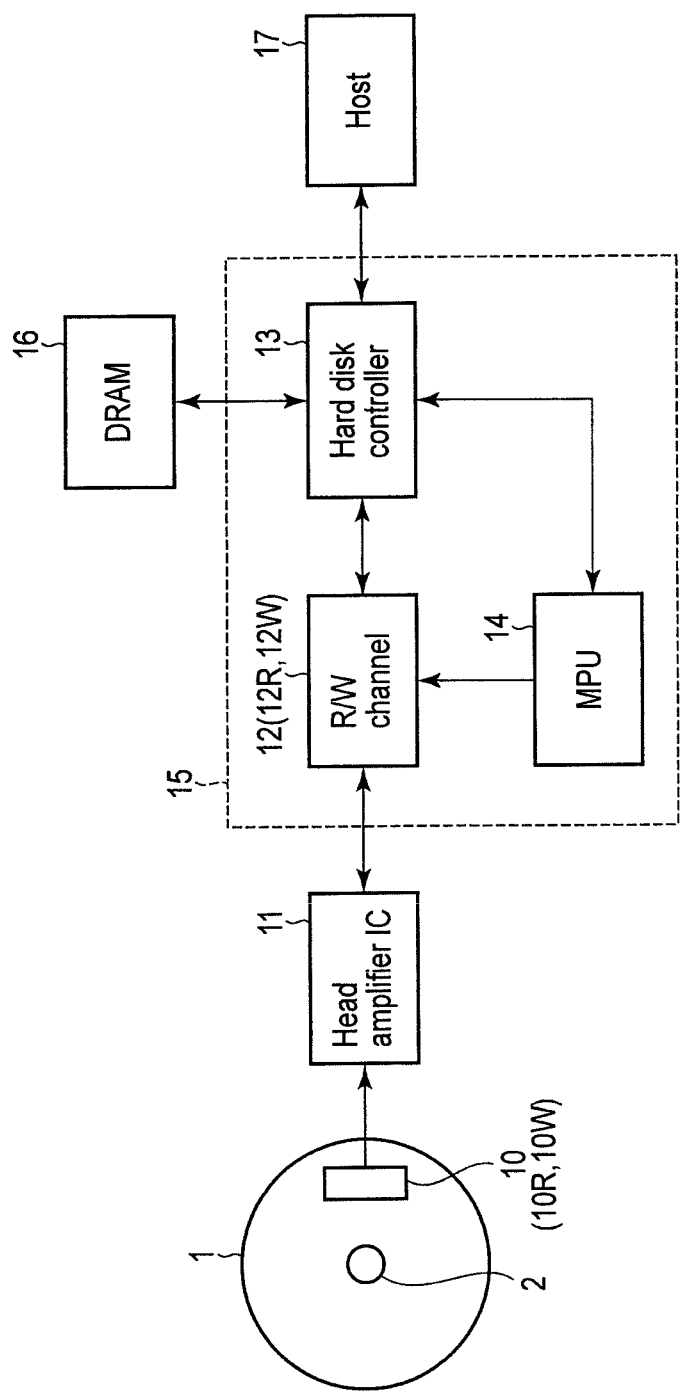
F I G. 2

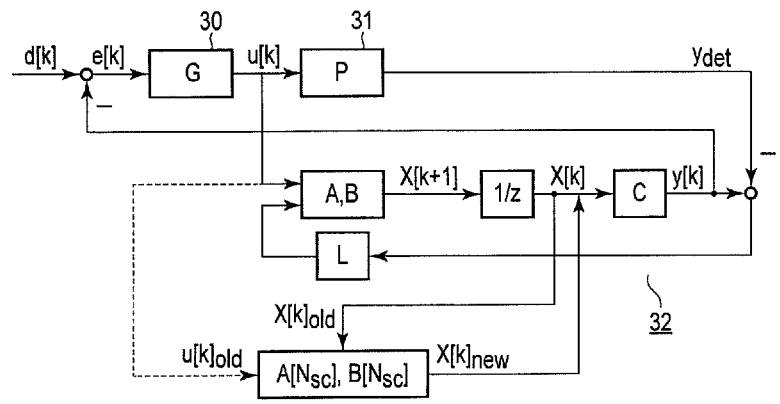
F I G. 3
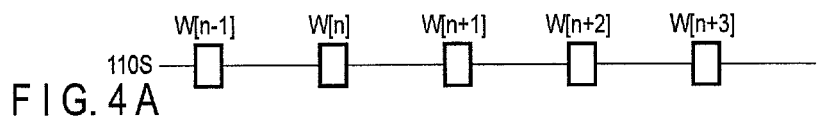
F I G. 4 A
F I G. 4 B
F I G. 4 C
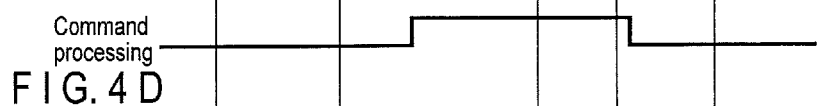
F I G. 4 D
F I G. 4 E
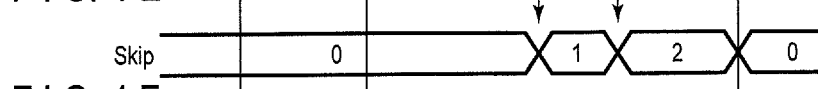
F I G. 4 F
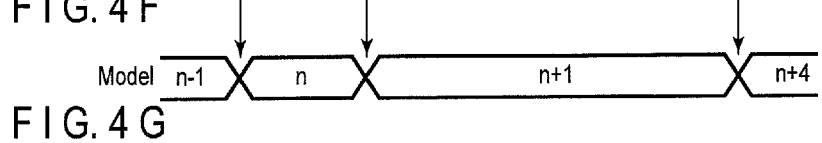
F I G. 4 G

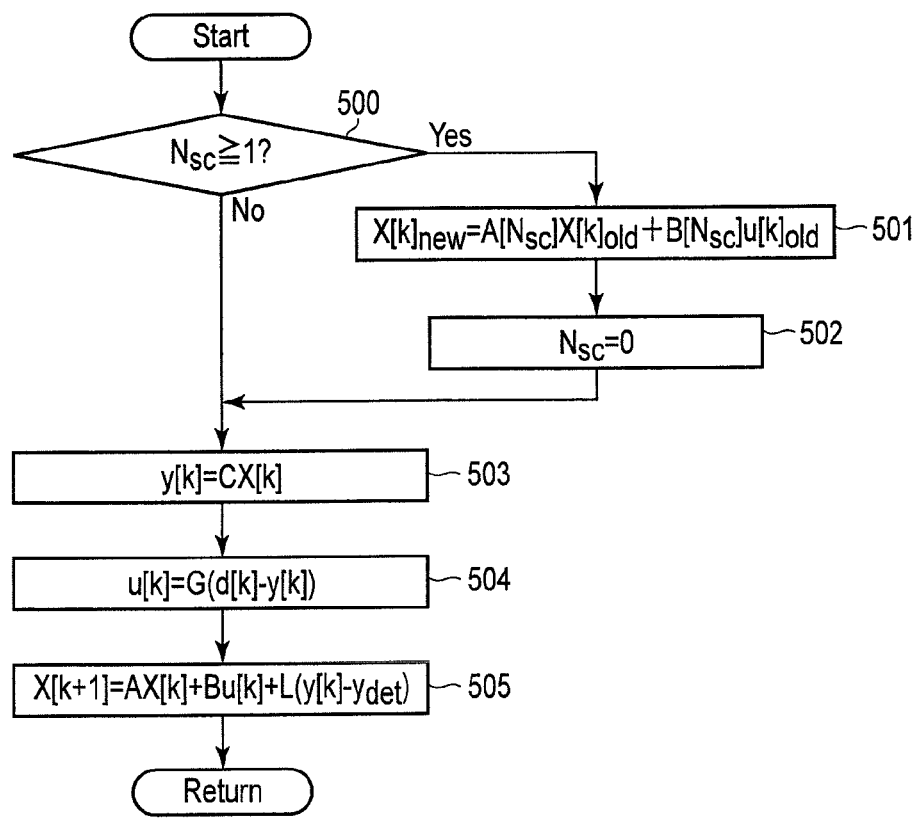
F I G. 5

DISK STORAGE APPARATUS AND METHOD FOR SERVO CONTROLLING

CROSS-REFERENCE TO RELATED APPLICATIONS

This application is based upon and claims the benefit of priority from Japanese Patent Application No. 2012-263075, filed Nov. 30, 2012, the entire contents of which are incorporated herein by reference.

FIELD

Embodiments described herein relate generally to a disk storage apparatus, a method for servo controlling, and a data processing device applied to a control system.

BACKGROUND

A disk storage apparatus, for example, a hard disk drive (HDD), conventionally carries out, besides processing of commands for read/write operations from a host, servo processing in which positioning control is performed to place a head at a target position on a disk.

A controller for the HDD generates a servo interrupt request at a sampling point of time when servo information on the disk is to be read, and shifts to servo processing in accordance with execution of servo interrupt processing. In this case, in order to preferentially carry out command processing, the controller determines not to carry out the servo interrupt processing and skips the servo interrupt processing if the command processing is being carried out. Thus, the servo interrupt may be omitted while the command processing is in execution.

The HDD carries out servo processing by a method based on a feedback control system including a state observer. In this case, the state observer carries out arithmetic processing on an internal model corresponding to a control target, and in actuality, estimates the current position of the head. The state observer carries out the model arithmetic processing so that an internal model state follows the actual head position calculated using the servo information.

Here, when the execution of the servo interrupt processing is skipped while the command processing is being carried out, no servo information is obtained during this period, precluding the actual head position from being detected. Thus, when servo processing is started immediately after the command processing ends, the state observer carries out the model arithmetic processing based on an estimated position deviating from the actual head position. Hence, in particular, an increased number of skips in the execution of the servo interrupt processing may cause a feedback control system to make undesirable responses, thus degrading the performance of the apparatus and further making servo control processing unstable.

BRIEF DESCRIPTION OF THE DRAWINGS

FIG. 1 is a block diagram for explaining an important part of a microprocessor according to an embodiment;

FIG. 2 is a block diagram for explaining a configuration of a disk drive according to the embodiment;

FIG. 3 is a block diagram for explaining a configuration of a servo control system according to the embodiment;

FIGS. 4A, 4B, 4C, 4D, 4E, 4F, and 4G are timing charts for explaining servo interrupt processing according to the embodiment;

FIG. 5 is a flowchart for explaining servo interrupt processing and servo control processing according to the embodiment;

DETAILED DESCRIPTION

Figure 6:
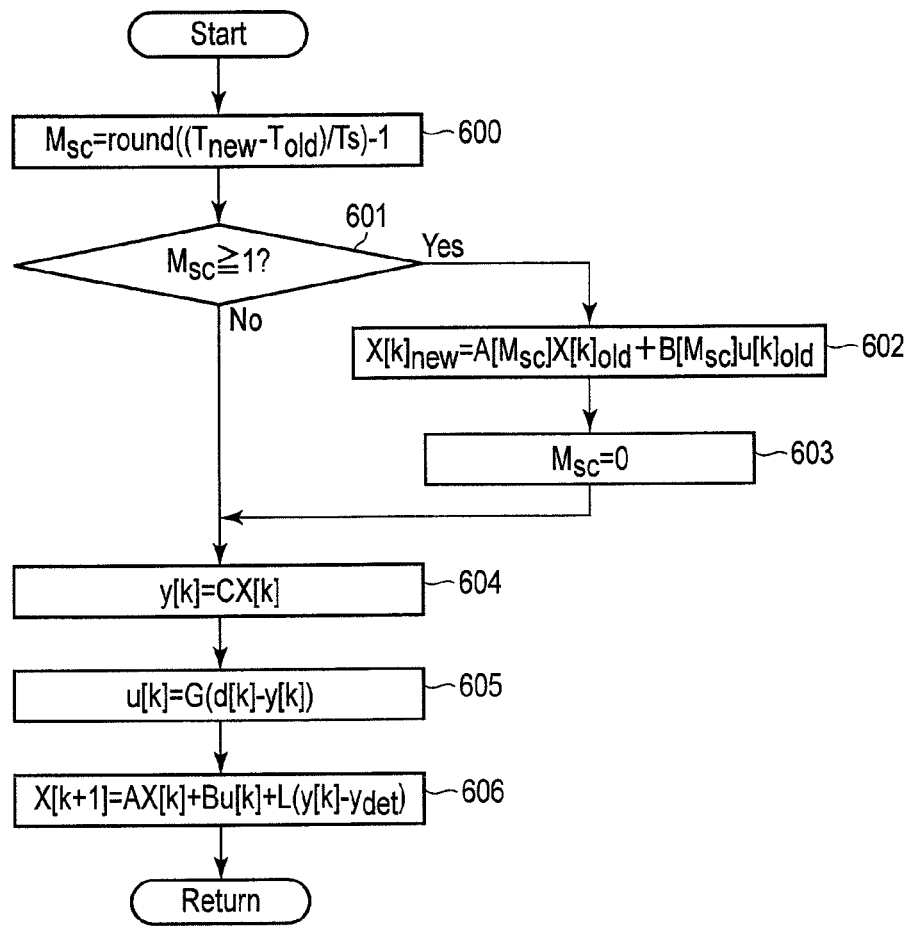
FIG. 6 is a flowchart for explaining servo interrupt processing and servo control processing according to a modification of the embodiment.

In general, according to one embodiment, a disk storage apparatus includes an interrupt controller and a servo controller. The interrupt controller determines whether or not to carry out servo interrupt processing and holds a number of negative results of the determination. The servo controller includes an internal model configured to follow a detected position of the head to calculate an estimated current position which is a position error with respect to a target position of the head. The servo controller corrects a state of the internal model based on the number of negative results of the determination and performs head positioning control based on a result of a calculation of the internal model, if the result of the determination by the interrupt controller is affirmative.

Various embodiments will be described hereinafter with reference to the accompanying drawings.

Disk Drive Configuration

FIG. 1 and FIG. 2 are block diagrams for explaining essential parts of a microprocessor and a disk drive according to the present embodiment.

As shown in FIG. 2, the disk drive generally comprises a head-disk assembly (HDA), a head amplifier integrated circuit (hereinafter referred to as a head amplifier IC), and a system on a chip (SoC) 15. The HDA comprises a disk 1 which is a storage medium, a spindle motor (SPM) 2, and a head 10. The disk 1 is rotated by a spindle motor 2.

The head 10 is controllably moved to a target position on the disk 1 by driving performed by an actuator including a voice coil motor (VCM). The head 10 comprises a slider as a main body and a write head 10W and a read head 10R mounted on the slider. The read head 10R reads servo information from a servo area on the disk 1 and reads user data from a data area. Servo information is also referred to as a servo wedge (SVW). The write head 10W writes user data to the data area on the disk 1.

The head amplifier IC (HIC) 11 comprises a read amplifier and a write driver. The read amplifier amplifies a read signal read by the read head 10R and transmits the amplified read signal to a read/write (R/W) channel 12. On the other hand, the write driver transmits a write current corresponding to write data output through the R/W channel 12, to the write head 10W.

The SoC 15 comprises an integrated circuit on one chip including the R/W channel 12, a hard disk controller (HDC) 13, and a microprocessor (MPU) 14. The R/W channel 12 includes a read channel (RIC) 12R and a write channel 12W. The read channel (RIC) 12R processes a read signal to decode servo information and user data in the signal as described below. The write channel 12W carries out signal processing on write data.

The hard disk controller (HDC) 13 includes an interface controller which controls data transfers between a host 17 and the R/W channel 12, and a user logic circuit. The interface controller performs data transfer control by controlling a buffer memory (DRAM) and temporarily storing read data and write data in the buffer memory 16. The user logic circuit comprises various arithmetic circuits formed of hardware and quickly carries out calculations at a level lower than the level of calculations executed by an MPU 14.

The MPU 14 is a main controller for the disk drive, and comprises a servo control system which carries out servo control processing as described below. The servo control system controls, by sampling processing, a head positioning mechanism which places the head 10 at a target position. The head positioning mechanism comprises the actuator (including the VCM) configured to drive the head and a VCM driver.

For convenience, FIG. 1 expresses a configuration of the MPU 14 in terms of hardware and firmware (software). As shown in FIG. 1, the MPU 14 comprises a register 20, an OR gate 21, a program counter (PC) 22, and a skip counter 25. Moreover, the MPU 14 executes a main routine 23, a servo interrupt processing routine 24, and a command processing routine 26.

Operation of the Embodiment

Servo interrupt processing and servo control processing according to the present embodiment will be described below with reference to FIG. 3 to FIG. 5.

First, the servo interrupt processing according to the present embodiment will be described with reference to a timing chart in FIG. 4.

When the disk drive carries out the servo control processing in which the head 10 is placed at the target position on the disk 1, the head 10 reads servo information (SVW). The servo information (SVW) is periodically recorded on the disk 1 in a circumferential direction. The head amplifier IC (HIC) 11 amplifies a read-out signal (including a reproduction signal for the servo information) 100R, and transmits the read signal to the read/write (R/W) channel 12. The read channel (RIC) 12R processes the reproduction signal 110S for the servo information contained in the output from the HIC 11 to decode the servo information.

Upon detecting a predetermined pattern indicative of the head of a servo address mark included in the servo information, the read channel (RIC) 12R outputs a servo address mark detection signal 120SM. Upon receiving the servo address mark detection signal 120SM, the hard disk controller (HDC) 13 generates and outputs a servo interrupt request signal 130IQ to the MPU 14.

In the MPU 14, when the servo interrupt request signal 130IQ is set in the register 20, if an interrupt inhibition signal Inh is negated, the OR gate 21 asserts the interrupt inhibition signal Inh. That is, the OR gate 21 outputs a servo interrupt signal SVI to the program counter (PC) 22. Here, the interrupt inhibition signal Inh is asserted by interrupt mask processing 27 contained in the command processing routine 26.

The value in the program counter (PC) 22 is rewritten to the leading address of the servo interrupt processing routine 24 in accordance with the servo interrupt signal SVI. At the same time, the servo interrupt signal SVI from the OR gate 21 resets a servo interrupt control signal 131IC which is an output from the register 20.

FIGS. 4A to 4G are timing charts showing timings for the above-described processing.

That is, as shown in FIGS. 4A and 4B, when W[n−1] which is servo information SVW read from the servo area (n−1th sector) on the disk 1 is detected, the read channel (RIC) 12R outputs the servo address mark detection signal 120SM. Moreover, the hard disk controller (HDC) 13 generates and outputs a servo interrupt request signal 130IQ to the MPU 14.

As shown in FIG. 4C, the register 20 in the MPU 14 outputs a servo interrupt control signal 131IC.

As shown in FIG. 4E, when the OR gate 21 outputs the servo interrupt signal SVI in response to the valid servo interrupt control signal 131IC, the MPU 14 executes the servo interrupt processing routine 24. The MPU 14 carries out arithmetic processing on the internal model of the servo control system during the servo interrupt processing routine 24 as described below. As shown in FIG. 4G, in accordance with the results of the arithmetic processing on the internal model, the internal model state in the nth sector, the next sector, is determined. Similar processing is carried out when W[n] which is the servo information SVW read from the servo area (nth sector) is detected.

As shown in FIG. 4D, in a command wait state during the main routine 23, the MPU 14 has stopped carrying out the command processing. Here, when a command processing request is made by the host 17, the MPU 14 invokes the command processing routine 26 to carry out the command processing.

On the other hand, when a servo interrupt request is made during the main routine 23, the value in the PC 22 is rewritten to the leading address of the servo interrupt processing routine 24. Thus, the MPU 14 executes the servo interrupt processing routine 24. After executing the servo interrupt processing routine 24, the MPU 14 returns to the main routine 23.

Here, as shown in FIGS. 4D and 4E, the servo interrupt processing routine 24 is inhibited from being carried out during the execution of the command processing routine 26. That is, the MPU 14 preferentially carries out the command processing over the servo interrupt processing. Specifically, if the command processing routine 26 is executed, the interrupt mask processing 27 is carried out at the beginning of the command processing routine 26 in order to prevent inconsistency with the servo interrupt processing. This allows the interrupt inhibition signal Inh to be asserted, preventing the OR gate 21 from outputting the servo interrupt signal SVI. When the command processing ends, interrupt mask cancellation processing 29 is carried out to negate the interrupt inhibition signal Inh. Thus, as shown in FIGS. 4C to 4E, when a servo interrupt request is made, the servo interrupt processing routine 24 is executed again.

As shown in FIG. 3, the disk drive incorporates a servo control system including a state observer 32, as a head positioning control system. The servo control system generally comprises a head positioning mechanism 31 which is a control target (plant P), and the MPU 14. The head positioning mechanism 31 comprises the actuator (including the VCM) configured to drive the head 10 and the VCM driver. The MPU 14 executes the servo interrupt processing routine 24 to carry out arithmetic processing (servo control processing) for a feedback control function (feedback filter G) 30 and the state observer 32.

The state observer 32 comprises a dynamics model (internal model) which carries out model calculations for estimating the position and the velocity of the head 10, in parallel with a feedback control calculation (feedback control function 30). As shown in FIG. 3, the head positioning mechanism 31 (plant P) outputs a detected position ydet in response to a discrete control input u[k]. Here, k denotes a time normalized to a sampling period.

The internal model in the state observer 32 is a dynamics model equivalent to the plant P and is arithmetic processing corresponding to a state equation "$X[k+1]=AX[k]+Bu[k]$" and an output equation "$y[k]=CX[k]$". $X[k]$ means the state variable vector of the internal model at a sampling point of time. $u[k]$ denotes a control input for the internal model calculated by the feedback control calculation (30). y[k] denotes an output from the internal model (here, the estimated position of the head 10). A, B, and C each denote a coefficient matrix representing the dynamics of the internal model.

The servo control system receives, as the position output y[k] for the current sample, the state variable of the expected next sample calculated during the last sampling (this state variable is the predicted value of the state variable of the current sample). The servo control system thus uses the position output as the current position corresponding to the detected position ydet. The servo control system calculates the difference between the target position d[k] and the current position y[k] to be a position error e[k].

The feedback control calculation (30) uses the feedback filter G designed to stably keep the position error e[k] at zero, to calculate the control input u[k] for the plant P (31). Here, the state observer 32 allows the behavior of the internal model, which is a dynamics model, to follow the behavior of the plant P, which is the actual mechanism 31. Specifically, the difference (estimated error) between the detected position ydet and the estimated position y[k] is fed back by a gain L.

In such a servo control system, the MPU 14 executes the servo interrupt processing routine 24 to carry out the servo control processing (head positioning control) in which the head 10 is placed at the target position d[k] on the disk 1. Here, since the MPU 14 preferentially carries out the command processing as described above, if a long time is required to execute the command processing routine 26, the servo interrupt processing routine 24 is stopped for the corresponding time. Thus, the arithmetic processing otherwise executed on the internal model during predetermined sampling fails to be accurately carried out.

This situation will be specifically described with reference to FIGS. 4A to 4G.

As shown in FIGS. 4A and 4D, when a command processing request is made while the head 10 is scanning an area between W[n] and W[n+1], which are the servo information SVW, the MPU 14 invokes the command processing routine 26 to carry out the command processing. The head 10 detects W[n+1], and thus as shown in FIG. 4C, the servo interrupt control signal 131IC is asserted (becomes valid).

On the other hand, since the command processing routine 26 is in execution, servo interrupts are inhibited, preventing the servo interrupt processing routine 24 from being carried out as shown in FIG. 4E. Thus, while the servo interrupt processing routine 24 is not in execution, the internal model state (estimated position y[k]) of the state observer 32 is maintained at the n+1th sector, which is the next sector, as shown in FIG. 4G. That is, W[n] is recorded in the nth sector, and thus the internal model maintains the estimated position y[k] corresponding to the detected position ydet based on W[n].

As shown in FIGS. 4A, 4D, and 4E, when the command processing routine 26 ends after W[n+2] is detected, servo interrupt requests are permitted. Here, since the estimated value for the expected next sample is saved as the state of the internal model, the state corresponds to a transition model for the n+2th sector even though the W[n+3] in the n+3th sector is detected. That is, the state determined in this case corresponds to a time elapsed model for the n+2th sector, which is one sample ahead of the already determined model for the n+1th sector.

The internal model state otherwise corresponding to the n+4th sector as shown in FIG. 4G is determined to be the n+2th sector, which is older than the n+4th sector by two sectors. The state observer 32 modifies the estimated position y[k] so that the internal model follows the detected position ydet. However, immediately after the end of the command processing routine 26, the feedback control calculation (30) is carried out based on an estimated position deviating from the actual position ydet. This deviation is gradually converged by the observer feedback gain L in FIG. 3. However, undesired transient responses occur during the convergence.

Thus, the MPU 14 according to the present embodiment observes the servo interrupt control signal 131IC generated during the execution of the command processing routine 26. If the servo interrupt control signal 131IC is asserted, the MPU 14 carries out interrupt reset processing 28 to negate the servo interrupt control signal 131IC. This prevents the servo interrupt processing from being carried out on the servo information (for example, W[n+1]). The MPU 14 determines that the servo interrupt processing has been skipped. The MPU 14 then increments a count value Skip in the skip counter 25 and holds the number of skips in the servo interrupt processing.

Even if the time to execute the command processing routine 26 spans the time required to pass a plurality of pieces of servo information, the skip counter 25 increments the skip count in response to reset processing 28 at a predetermined timing. When the execution of the command processing routine 26 ends to cancel the inhibition of the servo interrupt processing and the servo interrupt control signal 131IC is generated, the MPU 14 executes the servo interrupt processing routine 24.

Here, the servo interrupt processing routine 24 holds the estimated value, for the expected next sample, of the state variable of the internal model calculated during the last execution of the servo interrupt processing. In the servo interrupt processing routine 24, if the count value Skip held in the skip counter 25 is at least 1, the held state variable corresponds to a past value for a sample older than the actual sample by as many samples as the number of skips Skip. Thus, the servo interrupt processing routine 24 carries out processing of advancing the model calculation by the amount of time corresponding to the number of samples equal to the count value Skip.

A procedure for the servo interrupt processing routine 24 executed by the MPU 14 will be described below with reference to a flowchart in FIG. 5.

Here, the count value Skip held in the skip counter 25 is referred to as a skip count $N_{SC}$. The MPU 14 determines whether or not the skip count is at least 1 (block 500). If the skip count is 0, the servo interrupt processing has not been skipped, and the MPU 14 thus carries out an output calculation "y[k]=CX[k]" for the internal model as shown in FIG. 3 (NO in block 500, 503). The MPU 14 further carries out a calculation "u[k]=G(d[k]−y[k])", which is the feedback control calculation 30 (block 504). The MPU 14 subsequently carries out the next state prediction calculation "X[k]=AX[k]+Bu[k]+L(y[k]−ydet)" (block 505).

On the other hand, if the skip count is at least 1, the MPU 14 carries out a correction calculation "$X[k]_{new}=A[N_{SC}]*X[k]_{old}+B[N_{SC}]*u[k]_{old}$" for correcting the current predicted state (YES in block 500, 501). Here, $X[k]_{old}$ denotes a predicted state held during the last servo interrupt processing. Furthermore, $u[k]_{old}$ denotes a control input value provided during the last servo interrupt processing. $X[k]_{new}$ denotes a predicted state updated (corrected) by an updating calculation for Nsc samples (with coefficient matrices A[Nsc], B[Nsc]) (see FIG. 3). The MPU 14 resets the skip counter 25 (block 502). The MPU 14 subsequently carries out an output calculation for the internal model, a feedback control calculation, and a next state prediction calculation (blocks 503 to 505) as in the case where the skip count is 0.

As described above, according to the present embodiment, if the servo interrupt processing is skipped during the execution of the preferentially executed command processing, the state of the internal model corresponds to the elapsed time of execution of the command processing (the state variable X[k] of the internal model at a sampling point of time). In other words, the number of skips is counted and held to allow the internal model calculation to be temporally advanced by the amount of time equivalent to the skip count when the servo interrupt processing for each sampling is recovered.

Thus, the MPU 14 can achieve accurate calculations on the internal model in carrying out the servo interrupt processing routine 24 in accordance with a servo interrupt request after the execution of the command processing routine 26 ends. Thus, the present embodiment can inhibit the servo control system from making undesirable responses immediately after the end of the command processing as a result of the deviation between the estimated position and the actual position. Therefore, the present embodiment can perform stable head positioning control (servo control).

Modification

FIG. 6 is flowchart for explaining a procedure for the servo interrupt processing routine 24 according to a modification of the present embodiment.

The present embodiment adopts a method in which the servo interrupt processing calculates the skip count using the skip counter 25. The modification provides a method in which the servo interrupt processing estimates the skip count based on a difference from a time stamp corresponding to the last execution of a servo interrupt routine.

The MPU 14 holds a timer value saved during the last execution of the servo interrupt processing routine, in an internal memory (not shown in the drawings). The timer value is denoted by Told. Te MPU 14 divides the difference between the timer value Told and the current timer value Tnew by a sampling time Ts, rounds the quotient to an integral value, and subtracts 1 from the integral value. The MPU 14 then sets the resultant value Msc to be the skip count value Skip for the servo interrupt processing routine 24 (block 600). In this case, the execution of the command processing routine 26 does not necessarily require processing of incrementing a skip count value Msc.

If the skip count value Msc is 0 (NO in block 601), the servo interrupt processing has not been skipped, and the MPU 14 thus carries out an output calculation for the internal model, a feedback control calculation, and a next state prediction calculation (blocks 604 to 606) as is the case with the processing in FIG. 5 (blocks 503 to 505).

On the other hand, if the skip count Msc is at least 1, the MPU 14 carries out a correction calculation "$X[k]_{new}=A[M_{SC}]*X[k]_{old}+B[M_{SC}]*u[k]_{old}$" for correcting the current predicted state (YES in block 601, 602). The MPU 14 subsequently resets the timer value Msc in the internal memory (block 603).

As described above, the modification also counts and holds the number of skips Msc to allow the internal model calculation to be temporally advanced by the amount of time equivalent to the skip count when the servo interrupt processing for each sampling is recovered. Thus, the modification can inhibit the servo control system from making undesirable responses immediately after the end of the command processing as a result of the deviation between the estimated position and the actual position. Therefore, the modification can perform stable head positioning control (servo control). In other words, even if the execution of the servo interrupt processing is skipped, the modification can avoid degrading the performance of the apparatus and making the servo control processing unstable.

The modification determines the skip count based on a time stamp difference between execution values for the servo interrupt processing during two consecutive sampling operations. The modification can thus deal with a sampling interrupt request resulting from a servo mark detection error.

Furthermore, the present embodiment and the modification exert the following effect if a configuration is used in which a sector number is counted by firmware. Even if the servo interrupt routine is skipped to prevent execution of processing of incrementing a value in a sector counter, the sector number can be corrected using the number of skipped servo interrupts when the servo interrupt processing is recovered. Additionally, if the command processing requires a long time, the present embodiment and the modification can deal not only with skips in the servo interrupt processing but also with a failure to detect a servo address mark associated with signal quality.

Another Embodiment

Figure 7:
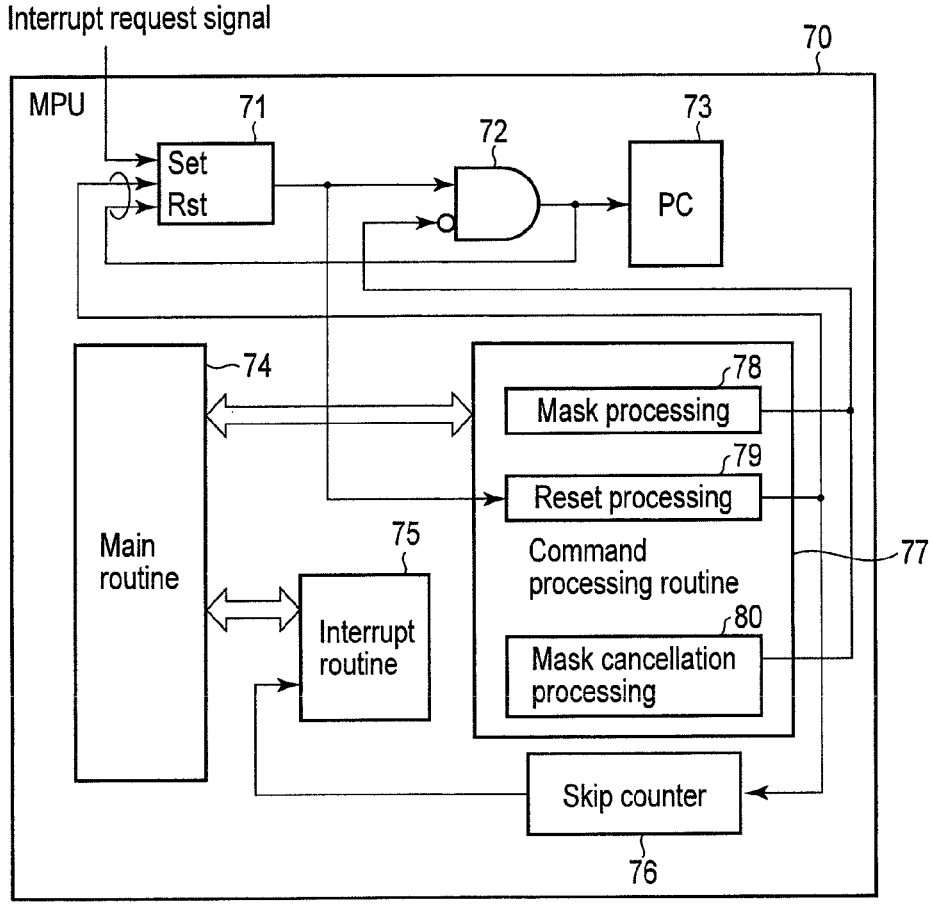
FIG. 7 is a block diagram for explaining a configuration of a microprocessor according to another embodiment.

FIG. 7 is a block diagram for explaining a configuration of an MPU 70 according to another embodiment.

The MPU 70 shown in FIG. 7 is applied to, besides the servo control of the HDD, for example, the servo control of an optical disc storage apparatus and various control systems. The basic functions and operations of the MPU 70 are similar to the basic functions and operations of the MPU 14 shown in FIG. 1. That is, the MPU 70 comprises a register 71, an OR gate 72, a program counter (PC) 73, and a skip counter 76. Moreover, the MPU 70 serves as firmware to execute a main processing routine 74, an interrupt processing routine 75, and a command processing routine 77. The command processing routine 77 includes interrupt mask processing 78, interrupt reset processing 79, and an interrupt mask cancellation process 80.

The MPU 70 receives an interrupt signal 70OIQ for control continuously performed during predetermined sampling. Furthermore, the MPU 70 uses the interrupt processing routine 75 to implement a control system. The control system allows the state observer to carry out a model calculation and a feedback control calculation in order to update the state of the internal model during sampling. The MPU 70 allows the skip counter 76 to count and hold the number of interrupt abortions (the number of skips) to correct the state of the internal model associated with the interrupt abortion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A disk storage apparatus comprising:
an interrupt controller configured to determine whether to permit or reject servo interrupt processing and to store a number of rejection results of the determination; and
a servo controller comprising an internal model configured to follow a detected position of a head to calculate an estimated current position, which is a position error with respect to a target position of the head, wherein the servo controller is configured to correct a state of the internal model based on the number of rejection results of the determination, which is held by the interrupt controller, if the result of the determination by the interrupt controller is permission, and perform head positioning control based on a result of a calculation of the internal model.

2. The disk storage apparatus of claim 1, further comprising:

a command processor configured to inhibit the servo interrupt processing and to preferentially carry out command processing, wherein the interrupt controller is configured to determine whether or not to carry out the servo interrupt processing based on a state of execution of the command processing in response to a servo interrupt request at each sampling point of time, and count and hold the number of rejection results of the determination corresponding to an elapsed time of execution of the command processing in accordance with a rejection in the result of the determination.

3. The disk storage apparatus of claim 2, wherein the servo controller is configured to correct a state variable of the internal model calculation based on a time corresponding to the number of rejection results of the determination when the servo interrupt processing is recovered after execution of the command processing.

4. The disk storage apparatus of claim 2, wherein the command processor is configured to inhibit the servo interrupt processing occurring during the execution of the command processing, and permit the servo interrupt processing after the execution of the command processing ends.

5. The disk storage apparatus of claim 1, further comprising:

a command processor configured to carry out command processing, wherein the command processor is configured to inhibit the servo interrupt processing in accordance with a rejection of a servo interrupt request during execution of the command processing.

6. The disk storage apparatus of claim 1, wherein the interrupt controller is configured to count and store the number of rejection results of the determination based on a timer value indicative of a measured elapsed time of execution of the servo interrupt processing.

7. The disk storage apparatus of claim 1, wherein the servo controller is configured to:

perform a feedback control calculation which calculates a control input value for moving a position of the head based on the estimated current position and a state prediction calculation which calculates a next state predicted value of the internal model obtained at a sampling point of time; and correct the state predicted value based on the number of rejection results of the determination at start time of the servo interrupt processing.

8. A method of servo controlling in a disk storage apparatus including an internal model configured to follow a detected position of a head to calculate an estimated current position which is a position error with respect to a target position of the head, and performing head positioning control, the method comprising:

determining whether or not to permit or reject servo interrupt processing;

storing a number of rejection results of the determination; and correcting a state of the internal model based on the stored number of rejection results of the determination if the result of the determination is permission.

9. The method of claim 8, further comprising:

inhibiting the servo interrupt processing and preferentially carrying out command processing;

determining whether or not to carry out the servo interrupt processing based on a state of execution of the command processing in response to a servo interrupt request at each sampling point of time; and counting and holding the number of rejection results of the determination corresponding to an elapsed time of execution of the command processing in accordance with a rejection in the result of the determination.

10. The method of claim 9, further comprising:

correcting a state variable of the internal model calculation based on a time corresponding to the number of rejection results of the determination when the servo interrupt processing is recovered after execution of the command processing.

11. The method of claim 9, further comprising:

inhibiting the servo interrupt processing occurring during the execution of the command processing; and permitting the servo interrupt processing after the execution of the command processing ends.

12. The method of claim 8, further comprising:

inhibiting the servo interrupt processing in accordance with a rejection of a servo interrupt request during execution of a command processing routine.

13. The method of claim 8, further comprising:

counting and holding the number of rejection results of the determination based on a timer value indicative of a measured elapsed time of execution of the servo interrupt processing.

14. The method of claim 8, further comprising:

performing a feedback control calculation which calculates a control input value for moving a position of the head based on the estimated current position and a state prediction calculation which calculates a next state predicted value of the internal model obtained at a sampling point of time; and correcting the state predicted value based on the number of rejection results of the determination at start time of the servo interrupt processing.

15. A data processing device comprising:

an interrupt controller configured to determine whether or not to permit a control system to carry out interrupt processing every sampling point of time and to store a number of rejection results of the determination; and a processor comprising an internal model configured to follow an output value from a controlled object to calculate an estimated input value to the control system, which is an error with respect to a target value, wherein the processor is configured to correct a state of the internal model based on the number of rejection results of the determination, which is held by the interrupt controller, if the result of the determination by the interrupt controller is permission, and perform a calculation for the control system based on a result of a calculation of the internal model.

16. The data processing device of claim 15, further comprising:

a command processor configured to inhibit the interrupt processing and to preferentially carry out command processing, wherein the interrupt controller is configured to determine whether or not to carry out the interrupt processing based on a state of execution of the command processing in response to an interrupt request at each sampling point of time, and count and hold the number of rejection results of the determination corresponding to an elapsed time of execution of the command processing in accordance with a rejection in the result of the determination.

17. The data processing device of claim 16, wherein the processor is configured to correct a state variable of the internal model calculation based on a time corresponding to the number of rejection results of the determination when the interrupt processing is recovered after execution of the command processing.

18. The data processing device of claim 15, further comprising:
a command processor configured to carry out command processing,
wherein the command processor is configured to inhibit the interrupt processing in accordance with a rejection of an interrupt request during execution of the command processing.

19. The data processing device of claim 15, wherein the interrupt controller is configured to count and store the number of rejection results of the determination based on a timer value indicative of a measured elapsed time of execution of the interrupt processing.

20. The data processing device of claim 15, wherein the processor is configured to:
perform a control calculation which calculates a control input value for the control system and a state prediction calculation which calculates a next state predicted value of the internal model obtained at a sampling point of time; and
correct the state predicted value based on the number of rejection results of the determination at start time of the interrupt processing.

* * * * *